US011788914B2

(12) United States Patent
Xu et al.

(10) Patent No.: US 11,788,914 B2
(45) Date of Patent: Oct. 17, 2023

(54) CAPACITIVE PRESSURE DIFFERENCE SENSOR WITH IMPROVED BONDING AND MANUFACTURING METHOD

(71) Applicants: Langfang Zhichi Power Technology Ltd., Langfang (CN); Beihang University, Beijing (CN)

(72) Inventors: Tiantong Xu, Beijing (CN); Haiwang Li, Beijing (CN); Zhi Tao, Beijing (CN); Xiaoda Cao, Beijing (CN); Yanxin Zhai, Beijing (CN); Chunhui Yang, Beijing (CN); Haonan Lu, Beijing (CN); Di An, Beijing (CN); Hengyi Wang, Beijing (CN); Zhiyang Wang, Beijing (CN); Kaiyun Zhu, Beijing (CN); Weidong Fang, Beijing (CN); Wenbin Wang, Beijing (CN); Kaibo Lei, Beijing (CN); Wensong Xiao, Beijing (CN); Murun Li, Beijing (CN); Xiao Zhang, Beijing (CN); Yang Feng, Beijing (CN)

(73) Assignees: LANGFANG ZHICHI POWER TECHNOLOGY LTD., Langfang (CN); BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/109,357

(22) Filed: Feb. 14, 2023

(65) Prior Publication Data

US 2023/0258521 A1 Aug. 17, 2023

(30) Foreign Application Priority Data

Feb. 14, 2022 (CN) ........................ 202210133527.6

(51) Int. Cl.
*G01L 9/00* (2006.01)
*G01L 9/12* (2006.01)

(52) U.S. Cl.
CPC .............. *G01L 9/12* (2013.01); *G01L 9/0048* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 7,992,443 B2 * 8/2011 Opitz .................... B81B 3/0078 73/718
9,926,190 B2 * 3/2018 Chang ....................... B81B 7/02
(Continued)

FOREIGN PATENT DOCUMENTS

CN 104422548 A * 3/2015 ......... B81C 1/00698
CN 104692319 A 6/2015
(Continued)

OTHER PUBLICATIONS

CNIPA, Notification of a First Office Action for CN202210133527.6, dated Sep. 20, 2022.
(Continued)

*Primary Examiner* — Andre J Allen
(74) *Attorney, Agent, or Firm* — Zhigang Ma

(57) ABSTRACT

Provided are a pressure difference sensor, and a manufacturing method and an application thereof. A manner of bonding three layers of wafers is adopted, and the sensor includes an upper structure, an intermediate structure and a lower structure. Each of the upper structure and the intermediate structure is manufactured by a silicon-on-insulator (SOI) wafer, the lower structure is manufactured by patterned doped intrinsic silicon; and a lead pad of each of the
(Continued)

upper electrode, and the intermediate electrode and the lower electrode is located on a corresponding one of three-stepped steps at a side of the pressure difference sensor. Annular through holes are formed around the upper electrode and the lower electrode. A constant capacitance of a capacitance signal outputted by an upper capacitor of the sensor by extending an electric field line path of the constant capacitor part.

4 Claims, 10 Drawing Sheets

(58) Field of Classification Search

CPC ............... G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 19/0092; G01L 15/00; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 9/0022; G01L 19/0627; G01L 19/0046; G01L 9/06; G01L 7/084; G01L 19/0636; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 23/10; G01L 23/18; G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 11/00; G01L 27/002; G01L 27/007; G01L 9/0026; G01L 19/00; G01L 9/0089; G01L 9/045; G01L 9/14; G01L 1/2281; G01L 11/025; G01L 11/008; G01L 19/0654; G01L 7/22; G01L 9/0047; G01L 13/026; G01L 9/0076; G01L 9/0025; G01L 13/00; G01L 9/0035; G01L 19/0061; G01L 9/0005; G01L 9/10; G01L 9/0019; G01L 9/08; G01L 21/00; G01L 11/006; G01L 7/08; G01L 9/04; G01L 9/0041; G01L 9/0008; G01L 11/004; G01L 19/086; G01L 9/0057; G01L 1/18; G01L 19/083; G01L 19/069; G01L 19/10; G01L 19/16; G01L 13/023; G01L 7/048; G01L 9/0016; G01L 9/0027; G01L 9/0086; G01L 9/00; G01L 9/0079; G01L 9/0048; G01L 11/04; G01L 19/06; G01L 9/0091; G01L 1/20; G01L 11/002; G01L 23/24; G01L 7/182; G01L 19/0663; G01L 7/166; G01L 1/02; G01L 23/22; G01L 27/00; G01L 9/0036; G01L 9/0061; G01L 9/0039; G01L 23/125; G01L 9/0013; G01L 9/0092; G01L 21/04; G01L 7/104; G01L 9/0045; G01L 19/145; G01L 9/0033; G01L 1/142; G01L 9/0083; G01L 9/0098; G01L 7/24; G01L 1/2293; G01L 9/0029; G01L 9/02; G01L 21/22; G01L 7/022; G01L 9/0064; G01L 23/08; G01L 23/16; G01L 5/14; G01L 1/205; G01L 7/088; G01L 7/163; G01L 9/0007; G01L 23/222; G01L 1/2287; G01L 9/0085; G01L 1/16; G01L 1/2212; G01L 13/06; G01L 9/0004; G01L 21/14; G01L 23/02; G01L 9/003; G01L 9/025; G01L 9/085; G01L 1/14; G01L 1/148; G01L 9/0058; G01L 9/105; G01L 7/061; G01L 9/002; G01L 7/02; G01L 13/028; G01L 1/2231; G01L 23/28; G01L 9/0095; G01L 1/162; G01L 7/12; G01L 9/0032; G01L 9/0038; G01L 19/0076; G01L 7/024; G01L 21/10; G01L 1/246; G01L 19/149; G01L 7/086; G01L 1/005; G01L 7/06; G01L 7/102; G01L 1/2206; G01L 13/021; G01L 27/02; G01L 5/228; G01L 1/2262; G01L 1/24; G01L 1/26; G01L 23/00; G01L 9/0094; G01L 9/0082; G01L 1/125; G01L 11/06; G01L 9/0097; G01L 1/2268; G01L 19/144; G01L 21/30; G01L 21/34; G01L 23/221; G01L 7/187; G01L 7/20; G01L 23/26; G01L 7/068; G01L 1/225; G01L 23/32; G01L 7/14; G01L 1/144; G01L 1/165; G01L 23/12; G01L 1/146; G01L 1/241; G01L 7/045; G01L 1/086; G01L 7/108; G01L 9/18; G01L 13/04; G01L 17/005; G01L 5/18; G01L 1/127; G01L 1/22; G01L 1/245; G01L 21/32; G01L 1/183; G01L 1/2218; G01L 9/0023; G01L 1/243; G01L 23/145; G01L 5/0047; G01L 9/0088; G01L 1/106; G01L 5/0076; G01L 1/10; G01L 1/186; G01L 23/223; G01L 25/00; G01L 5/165; G01L 9/001; G01L 9/0017; G01L 1/044; G01L 3/245; G01L 5/226; G01L 1/08; G01L 21/16; G01L 3/1485; G01L 5/162; G01L 5/225; G01L 7/026; G01L 7/065; G01L 9/0014; G01L 1/242; G01L 21/24; G01L 3/10; G01L 5/0004; G01L 5/0052; G01L 9/005; G01L 1/00; G01L 1/04; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/243; G01L 1/083; G01L 1/12; G01L 21/36; G01L 23/04; G01L 23/14; G01L 23/30; G01L 3/103; G01L 5/00; G01L 5/0028; G01L 5/102; G01L 5/133; G01L 5/166; G01L 7/185; G01L 1/255; G01L 21/08; G01L 5/0033; G01L 5/0057; G01L 5/161; G01L 5/22; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/08; G01L 5/10; G01L 5/101; G01L 5/108; G01L 5/16; G01L 5/1627; G01L 5/167; G01L 5/28; G01L 23/085; G01L 23/20; G01L 5/0061; G01L 5/0071; G01L 5/008; G01L 5/06; G01L 5/171; G01L 7/106

USPC .................................................... 73/700–756

See application file for complete search history.

(56) References Cited

U.S. PATENT DOCUMENTS 10,227,233 B2 * 3/2019 Allegato ............. B81C 1/00269
2019/0256347 A1 * 8/2019 Chang .................. B81B 3/0005

FOREIGN PATENT DOCUMENTS

CN 110577185 A * 12/2019 .......... B81B 3/0021
CN 114459666 A * 5/2022

(56) References Cited

FOREIGN PATENT DOCUMENTS

| | | | | | |
|---|---|---|---|---|---|
| JP | 107245417 | A | | 9/1995 | |
| JP | 2001343301 | A | | 12/2001 | |
| JP | 2009270961 | A | * | 11/2009 | |
| WO | WO-2016087000 | A1 | * | 6/2016 | ........... G01L 13/025 |

OTHER PUBLICATIONS

Beijing University of Aeronautics and Astronautics (Applicant), Reply to Notification of a First Office Action for CN202210133527.6, w/ replacement claims, dated Dec. 12, 2022.

Beijing University of Aeronautics and Astronautics (Applicant), Supplemental Reply to Notification of a First Office Action for CN202210133527.6, w/ (allowed)replacement claims, dated Dec. 13, 2022.

CNIPA, Notification to grant patent right for invention in CN202210133527.6, dated Jan. 18, 2023.

* cited by examiner

Step 1:
1. Wet thermal oxidation
2. Double-sided glue coating (spin coating)
3. Double-sided photoresist patterning
4. Metal sputtering
5. Lift-off process Step 2:
1. Double-sided glue coating (spin coating)
2. Double-sided photoresist patterning
3. Using a BOE solution to remove a silicon dioxide layer
4. Glue removal

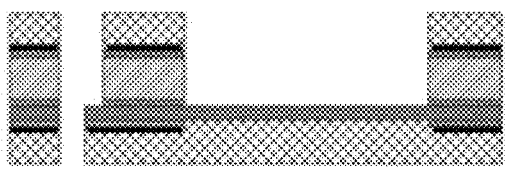

Step 3:
1. Double-sided glue coating (spin coating)
2. Double-sided photoresist patterning
3. Double-sided dry etching of silicon
4. Using a BOE solution to remove a silicon dioxide layer Step 4:
1. Glue removaling, gradually diluting a acetone solution, and evaporating the solution.

FIG. 7

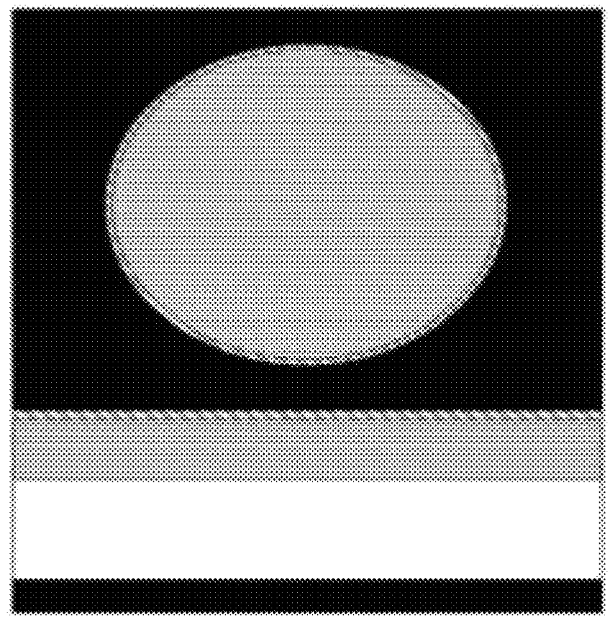

FIG. 8

Step 1:
1. Patterned doping (high dose, high voltage)

Step 2:
1. Wet thermal oxidation
2. Planarization operation

Step 3:
1. Double-sided glue coating
2. Double-sided photoresist patterning
3. Using a BOE solution to remove an oxide layer
4. Dry etching
5.Glue removal Step 4:
1. Dry thermal oxidation Step 5:
1. Single-sided glue coating (spray coating)
2. Single-sided exposure and development
3. Using a BOE solution to remove an oxide layer
4. Glue removal

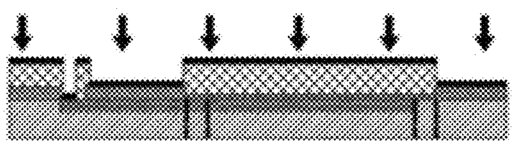

Step 6:
1. Single-sided glue coating (spray coating)
2. Single-sided photoresist patterning
3.Metal sputtering Step 7:
1. Using Lift-off to remove photoresist

FIG. 9

CAPACITIVE PRESSURE DIFFERENCE SENSOR WITH IMPROVED BONDING AND MANUFACTURING METHOD

TECHNICAL FIELD

The present disclosure relates to a sensor, and in particularly to a capacitive pressure difference sensor, and a manufacturing method and an application thereof, and belongs to a design field of an electronic component.

BACKGROUND

A pressure difference sensor is used in industrial measurement technology to measure a pressure difference between two separated cavities on the pressure difference sensor. A Micro-Electro-Mechanical Systems (MEMS) pressure difference sensor made by MEMS technology means that THE MEMS pressure difference sensor can be made of a wafer compound using a well-known MEMS semiconductor technology.

The pressure difference sensor has an intermediate-layer movable diaphragm arranged between two matrixes in a common manner. The intermediate-layer movable diaphragm and each of the two matrixes are enclosed to together to form two pressure cavities. In a measurement process, one pressure cavity at one side of the intermediate-layer movable diaphragm is loaded with a first pressure, the other pressure cavity at the other side of the intermediate-layer movable diaphragm is loaded with a second pressure, and a pressure difference between the two pressure cavities makes the intermediate-layer movable diaphragm shift to a side thereof with a weak pressure.

In the capacitive pressure difference sensor, a top portion and a bottom portion of the capacitive pressure difference sensor form an upper electrode and a lower electrode respectively, and the intermediate-layer movable diaphragm is located between the upper electrode and the lower electrode. The upper electrode and the lower electrode respectively form two capacitors with the intermediate-layer movable diaphragm. The shifting of the intermediate-layer movable diaphragm makes a spacing between the intermediate-layer movable diaphragm and an electrode with a weak pressure side decrease and makes a spacing between the intermediate-layer movable diaphragm and an electrode with a strong pressure increase. Correspondingly, one of capacitances of two capacitors on both sides of the intermediate-layer movable diaphragm becomes larger, and the other becomes smaller, which results in a capacitance difference, thus completing a conversion from a pressure difference signal to a capacitance difference signal.

Each of the upper capacitor and the lower capacitor of the capacitive pressure difference sensor includes two parts. Take the upper capacitor $C_{upper}$ (as shown in FIG. 1) as an example, one of the two parts is a capacitor $C_{upper\ variable}$ (also referred to as a variable upper capacitor), which is variable with the shifting of the intermediate-layer movable diaphragm, and the other of the two parts is a capacitor $C_{upper\ constant}$ (also referred to as a constant upper capacitor), which is not variable with the shifting of the intermediate-layer movable diaphragm. Based on this, an electric field line may also be divided into two parts, one of the two parts is an electric field line path corresponding to the variable upper capacitor, and the other of the two parts is an electric field line path corresponding to the constant variable upper capacitor.

In an actual measurement process, a capacitance change percentage of the upper capacitor is $\Delta C_{upper\ variable}/(C_{upper\ variable}+C_{upper\ constant})$, and a capacitance change percentage of the lower capacitor is similar to it. When a constant capacitor is too large, a proportion of a variable capacitor to a total capacitor of the upper capacitor is smaller, and a measurement accuracy is smaller. Therefore, during device design, it is necessary to improve a proportion of the variable capacitor to the total capacitor through materials and structures. For example, through reducing a cross-sectional area through which an electric field line of the constant capacitor can pass and extending the electric field line path of the constant capacitor, a capacitance value of the constant capacitor can be reduced and the proportion of the variable capacitor to the total capacitor can be increased.

For an existing capacitive pressure difference sensor, a silicon capacitive pressure difference sensor with a Fuji brand of Japan, as a representative, mostly adopts a multi-layer matrix structure, with doped silicon as upper and lower electrodes and an intermediate-layer movable diaphragm. Specifically, silicon conductive layers are separated by an insulating layer such as ceramics and an oxide layer, and conduction of electrodes often needs to pass through the insulating layers using for example through-hole sputtering or metal plating. Further, an external circuit lead from a side wall of the sensor, and a pressure guide hole is often located directly above and below a center of the intermediate-layer movable diaphragm. In an actual semiconductor sensor processing process, in order to facilitate cutting and reduce the cost, the sensor is often processed into a square. In the practical work of the existing capacitive pressure difference sensor, under the coordination of an anti-overload structure, the intermediate-layer movable diaphragm will not shift too much and will not contact with the upper and lower electrodes.

At present, the capacitive pressure difference sensor in the related art has at least the following defects.

An intermediate-layer movable diaphragm of the existing capacitive pressure difference sensor should be symmetrical on both sides, a thickness and smoothness of the intermediate-layer movable diaphragm should be taken into account, and the cleanliness and smoothness of a bonding surface should also be taken into account, therefore, a structure of the intermediate-layer movable diaphragm should not be too complicated, and an intermediate island structure and an ordinary flat film are often used. Based on a current structural design, the capacitive pressure difference sensor has to sacrifice more linearity, sensitivity or resolution. For a general intermediate island film, the shifting of the general intermediate island film mainly depends on an island film, which has a higher linearity, but has a lower sensitivity. For a common flat film with a higher sensitivity, its nonlinearity is higher, and the sensitivity decreases with the increase of a pressure difference, which makes it difficult to read and calibrate a signal.

The pressure guide holes of upper and lower electrode plates of the existing capacitive pressure difference sensor are often located directly above and below the center of the intermediate-layer movable diaphragm. When an over-range pressure difference signal is input, the intermediate-layer movable diaphragm of the sensor is easy to shift excessively, thereby blocking the pressure guide holes, and thus resulting in structural failure of the sensor. Therefore, in an actual packaging process, in order to avoid pressure overload, it is necessary to add an additional anti-overload structure, which makes a whole package structure of the sensor too large, so that it is not suitable for application in a small space.

For a constant capacitor of the existing pressure difference sensor, various products and patents have made efforts. For the capacitive pressure difference sensor with the Fuji brand of Japan, doped silicon is used as upper, intermediate and lower electrodes, and a thick ceramic layer is used as an insulating layer of a bonding portion of between the upper electrode and the intermediate electrode, which ensures that a spacing between the intermediate-layer movable diaphragm and the each of the upper and lower electrode plates is within tens of microns, and also prolongs the electric field line path of the constant capacitor, thereby reducing the constant capacitor. This design uses thick ceramics and thick silicon wafers for bonding, which greatly increases a dimension of the sensor. In Chinese patent No. CN 106471350A, doped silicon is used as each electrode and silicon dioxide is used as an insulating layer, and a groove is formed by etching the intermediate-layer movable diaphragm, a vacuum region is formed between the electrodes, which can reduce the constant capacitor. However, because a bonding area is determined by an actual process, it is difficult to substantially reduce a cross-sectional area through which an electric field line of the constant capacitor can pass, and each of a spacing between electrode plates at the bonding portion and a spacing between electrode plates at the intermediate-layer movable diaphragm is a thickness (several hundred nanometers to two or three microns) of a silicon dioxide layer, so it is difficult to actually reduce the constant capacitor too much.

A lead of the pressure difference sensor can be divided into two parts, one of the two parts is used to lead an electrode inside the pressure cavity to a surface of the sensor (called an internal lead), and the other of the two parts is used to lead the surface of the sensor to a signal reading circuit (called an external lead). A common manner for arranging the lead includes sputtering conductive metal and using doped silicon. For the capacitive pressure difference sensor with the Fuji brand of Japan, the internal lead of the upper and lower electrodes thereof is arranged through metal sputtering, and passes through the insulating layer made of ceramic, which realizes electrical communication between the upper and lower electrodes (doped silicon layer) in the cavity and external upper and lower cover plates (doped silicon layer). However, for the external lead of the capacitive pressure difference sensor with the Fuji brand of Japan, the lead passes through a side wall of a conductive layer of the sensor, which makes it difficult to integrate and package the sensor.

Most existing capacitive pressure difference sensors adopt silicon-silicon direct bonding or anode bonding to realize the air tightness of the cavity. The d silicon-silicon direct bonding requires high technological conditions such as a bonding temperature, a pressure and a surface flatness, and the process is difficult. For the anodic bonding, a thermal stress caused by mismatch of thermal expansion coefficients of silicon and glass is greatly reduced. While metal eutectic bonding can meet the requirements of the air tightness, a process thereof is simpler and a thermal stress is relatively small, which is more conducive to the bonding of a three-layer complex structure and the manufacturing of a three-layer capacitive pressure difference sensor.

SUMMARY

The present disclosure aims to provide a capacitive pressure difference sensor with a higher sensitivity (an intermediate-layer movable diaphragm can contact upper and lower constant electrodes without blocking a pressure guide hole, and a capacitance value can be adjusted by changing a spacing between capacitor plates and a contact area between the capacitor plates), a higher resolution (a smaller proportion of a constant capacitance value and a larger proportion of a variable capacitance), a wider linear output range, a stronger overload protection ability (bearing a pressure value 2 to 200 times of a full-scale), and a simpler lead manner (the electrode plates lead from a side wall of a pressure cavity to a surface of the sensor and connects to an external circuit from a side of the sensor), and a manufacturing method of the capacitive pressure difference sensor.

The technical solutions of the present disclosure are as follows.

A pressure difference sensor in provided according an embodiment of the present disclosure, which is manufactured by a manner of bonding three layers of wafers, and including: an upper structure, an intermediate structure and a lower structure; where each of the upper structure and the intermediate structure is manufactured by a silicon-on-insulator (SOI) wafer, and the lower structure is manufactured by patterned doped intrinsic silicon; where an upper electrode, an intermediate electrode and a lower electrode are respectively arranged on the upper structure, the middle structure and the lower structure, and a lead pad of each of the upper electrode, the intermediate electrode and the lower electrode is located on a corresponding one of three-stepped steps at a side of the pressure difference sensor; and where annular through holes are formed around the upper electrode and the lower electrode.

Preferably, the pressure difference sensor is made by cutting the three layers of wafers after bonding of the three layers of wafers, and a manner of the bonding is metal eutectic bonding; the metal eutectic bonding includes an upper metal bonding layer and a lower metal bonding layer, an upper portion of the upper metal bonding layer comes from an upper wafer and a lower portion of the upper metal bonding layer comes from an intermediate wafer; and an upper portion of the lower metal bonding layer comes from an intermediate wafer and a lower portion of the lower metal bonding layer comes from a lower wafer.

Preferably, the upper electrode is located in the upper structure, and is formed by processing the upper wafer; the intermediate electrode is located in the intermediate layer structure, and is formed by processing the intermediate wafer; and the lower electrode is located in the lower structure.

Preferably, a pressure guide hole in the upper structure and a pressure guide hole in the lower structure are arranged to be surround the upper electrode and the lower electrode respectively.

Preferably, the upper structure is made by processing the SOI wafer, an upper silicon part of the SOI wafer is intrinsic silicon with a high resistivity, an intermediate layer of the SOI wafer is silicon oxide, a lower silicon part of the SOI wafer is heavily doped silicon, and the upper electrode is derived from the heavily doped silicon of the lower silicon part of the SOI wafer;

the intermediate structure is made by processing the SOI wafer, an upper silicon part of the SOI wafer is intrinsic silicon with a high resistivity, an intermediate layer of the SOI wafer is silicon oxide, a lower silicon part of the SOI wafer is heavily doped silicon, and the intermediate electrode is derived from the heavily doped silicon of the lower silicon part of the SOI wafer; and the lead pad of the intermediate electrode is configured to connect the intermediate electrode to an external circuit; and the lower structure is made by processing an intrinsic silicon wafer with a high resistivity, the lower electrode is made through patterned doping of the wafer, a circular portion of a doped part mainly plays the role of a capacitor plate, a bottom rectangle portion of the doped part is configured to make ohmic contact with the lead pad of the lower electrode, and a portion between the circular portion and the bottom rectangle portion is a lead portion, which is responsible for realizing the electrical connection between the circular portion and the bottom rectangle portion.

Preferably, a spacing between the lower electrode and the intermediate electrode is composed of three parts including: silicon dioxide having supporting and insulating functions on a lower surface of the intermediate structure, the lower metal bonding layer, and silicon dioxide having supporting and insulating functions on an upper surface of the lower structure; a thickness of the silicon dioxide having supporting and insulating functions on the lower surface of the intermediate structure is in a range from 0 to 3 μm, a thickness of the lower metal bonding layer is in a range from 0 to 4 μm, a thickness of the silicon dioxide having supporting and insulating functions on the upper surface of the lower structure is in a range from 0 to 3 μm, and a sum of the three thicknesses is no more than m.

A manufacturing method of a sensor including the above pressure difference sensor is provided according to an embodiment of the present disclosure, where the method includes process flows for manufacturing the upper structure, the intermediate structure and the lower structure;

where the process flow for manufacturing the upper structure includes:

step 1, etching the pressure guide hole, a lead hole, an upper step hole, aligning marks and cutting marks located in the upper structure;

step 2, performing etching a lower surface to form a boss to prepare for manufacturing the upper electrode;

step 3, removing a silicon dioxide layer exposed after etching the lower surface;

step 4, forming an insulating silicon dioxide layer on a surface of the wafer, that is, the silicon dioxide having supporting and insulating functions on the lower surface of the intermediate structure, and the silicon dioxide having supporting and insulating functions on the upper surface of the lower structure;

step 5, exposing the upper electrode on the upper surface to prepare for a consequent lead;

step 6, preparing for manufacturing a portion of the upper metal bonding layer located in the upper structure; and step 7, manufacturing the portion of the upper metal bonding layer located in the upper structure;

where the process flow for manufacturing the intermediate structure includes:

step 1, forming silicon dioxide on a surface to: prepare for forming silicon dioxide having supporting and insulating functions on the lower surface of the intermediate structure and silicon dioxide having supporting and insulating functions on the upper surface of an intermediate structure; and prepare for forming a portion of the upper metal bonding layer located in the intermediate structure, a portion of the lower metal bonding layer located in the intermediate structure, and the lead pad of the lower electrode;

step 2, removing silicon dioxide on a surface of a portion to be etched;

step 3, forming a cutting hole and the intermediate-layer movable diaphragm; and step 4, removing the photoresist;

where the process flow for manufacturing the lower structure includes:

step 1: forming the lower electrode;

step 2: forming silicon dioxide on a surface of the lower structure to prepare for the subsequent processing, and reducing a roughness of the surface and improving a flatness of the surface;

step 3: forming the pressure guide hole in the lower structure to expose the lower electrode;

step 4, forming a silicon dioxide insulating layer on an exposed surface of the lower electrode;

step 5, exposing doped silicon under the lead pad of the lower electrode;

step 6, sputtering metal to prepare for forming a portion of the lower metal bonding layer located in the lower structure and the lead pad of the lower electrode; and step 7: forming a portion of the lower metal bonding layer located in the lower surface and the lead pad 25 of the lower electrode.

A design method of a Micro-Electro-Mechanical Systems (MEMS) contact capacitive pressure difference sensor, including the pressure difference sensor according to claim 1, and the method including:

(1) for a patterned constant electrode and a lead circuit thereof manufactured by a doping process, using ion implantation used to complete deep doping of a high dose and a high voltage for the electrode; after that, completing wet oxidation and planarization of a silicon wafer, and partially corroding a silicon oxide layer to expose a patterned part of the electrode; where the reason for the planarization operation is that an oxidation rate of a doped part is higher, resulting in a surface of the silicon oxide layer of the doped part being slightly higher than that of an undoped part, and a flatness of the whole wafer exceeds the requirement for the bonding; and (2) etching and cutting upper, intermediate and lower layers of bonded silicon wafers to form grooves respectively, where sensor areas of the three bonded silicon wafers have a same width, and a length increases from top to bottom of the three bonded silicon wafers by tens to hundreds of microns; and after covering the pressure guide hole with a mask, cutting the sensor into a rectangle and form a three-layer lead step.

The present disclosure has at least the following beneficial effects.

The electric field lines (a potential change path) of a constant capacitor part of the upper capacitor and a constant capacitor part of the lower capacitor of the sensor of the present disclosure is relatively longer (as shown in FIG. 1), and intrinsic silicon with a high resistivity (indicated by the reference numerals 3, 23 and 31 in FIG. 2) and silicon dioxide with a high resistivity and a relatively small dielectric constant (indicated by the reference numerals 15, 27 and 31 in FIG. 2) are used in the electric field line path, which makes the constant capacitors relatively small and a resistivity of the sensor greatly improved.

The present disclosure realizes the measurement of a fluid pressure difference in two different cavities by picking up the variation of two capacitors. A measuring film will shift to the side with a smaller pressure, a spacing between the measuring film and the electrode with the weak pressure will be reduced, a capacitor at the side with the smaller pressure will increase, and the capacitor at the side with a greater pressure will decrease. When the pressure difference further increases, the spacing between the intermediate-layer movable diaphragm and the electrode at the side with the smaller pressure will be further reduced until the intermediate-layer movable diaphragm is in contact with the electrode at the side with the smaller pressure. Further, the distance between the intermediate-layer movable diaphragm and the electrode at the side with the smaller pressure is equal to a thickness of an insulating layer, and with the increase of the pressure difference, the contact area will gradually increase, the capacitor at the side with the smaller pressure will further increase, the capacitor at the side with the greater pressure will further decrease, and the output sensitivity, resolution and linearity of the sensor will be improved.

When the pressure difference is overloaded, the intermediate-layer movable diaphragm will be attached to the side with the smaller pressure, and the electrode at the side with the smaller pressure will support and protect the intermediate-layer movable diaphragm.

External lead pads of the sensor are arranged at the three steps, and an external circuit is electrically connected with to the lead pads at the three steps of the sensor, which is convenient for the integration and packaging of the sensor.

BRIEF DESCRIPTION OF DRAWINGS

In order to more clearly explain embodiments of the present disclosure or the technical solution in the related art, accompanying drawings which are required in the description of the embodiments or the related art will be briefly introduced hereinafter. It is apparent that the accompanying drawings in the following description are merely some embodiments of the present disclosure, and for ordinary technicians in the field, other drawings can be obtained based on these accompanying drawings without creative labor.

FIG. 7 illustrates a schematic view of a manufacturing process of an intermediate structure of the pressure difference sensor according to an embodiment of the present disclosure.

FIG. 8 illustrates a top view of the intermediate structure according to an embodiment of the present disclosure after being processed in step 4.

FIG. 9 illustrates a schematic view of a manufacturing process of a lower structure of the pressure difference sensor according to an embodiment of the present disclosure.

REFERENCE NUMERALS

Figure 1:
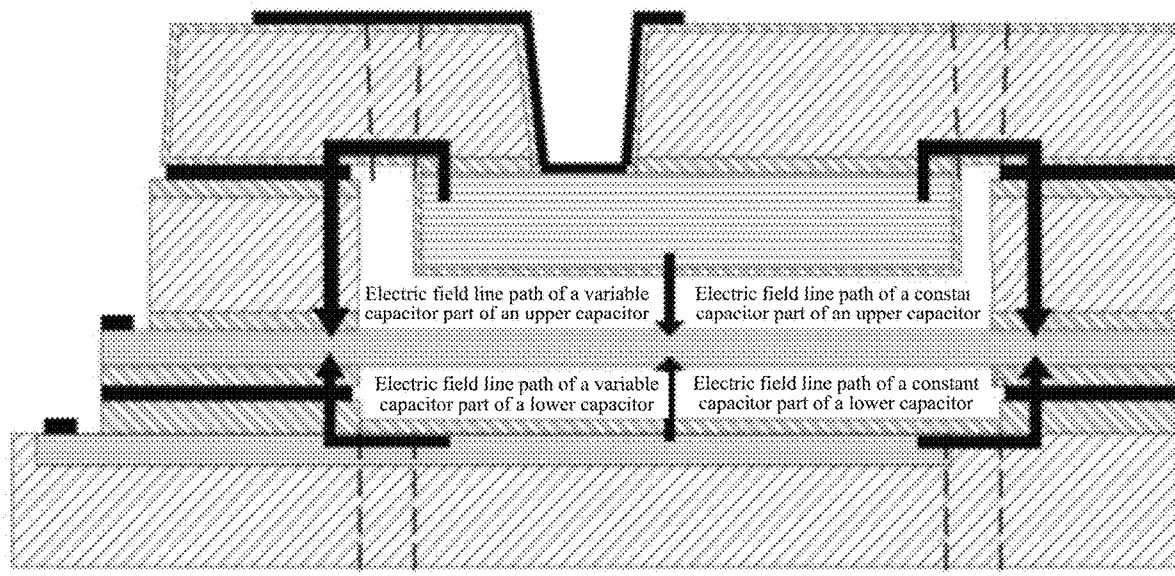
FIG. 1 illustrates a schematic view for explaining a distribution of capacitors of a capacitive pressure difference sensor according to an embodiment of the present disclosure.

1—pressure guide hole located in an upper structure;
3—intrinsic silicon portion of a silicon-on-insulator (SOI) wafer used for manufacturing an upper structure;
5—metal eutectic bonding portion (upper metal bonding layer) between an upper structure and an intermediate structure;
7—silicon dioxide insulation layer on a surface of an upper electrode;
9—intermediate silicon dioxide portion of an SOI wafer used for manufacturing an intermediate structure;
11—intermediate electrode;
13—metal eutectic bonding portion (lower metal bonding layer) between an intermediate structure and a lower structure;
15—silicon dioxide having supporting and insulating functions on an upper surface of a lower structure;
17—silicon dioxide insulation layer on a surface of a lower electrode;
19—lower electrode (a heavily doped part of substrate silicon);
21—pressure guide hole located in a lower structure;
23—intrinsic silicon portion of a lower structure;
25—lead pad of a lower electrode;
27—silicon dioxide having supporting and insulating functions on a lower surface of an intermediate structure;
29—lead pad of an intermediate electrode;
31—intrinsic silicon portion of an SOI wafer used for manufacturing an intermediate structure;
33—silicon dioxide having supporting and insulating functions on an upper surface of an intermediate structure;
35—silicon dioxide having supporting and insulating functions on a lower surface of an upper structure;
37—lead pad of an upper electrode;
39—upper electrode;
41—intermediate silicon dioxide portion of an SOI wafer used for manufacturing an upper structure;
43—intermediate-layer movable diaphragm (a movable portion of an intermediate electrode); and

45—silicon dioxide having an insulating function on an upper surface of an upper structure.

DETAILED DESCRIPTION OF EMBODIMENTS

In order to make objectives, technical solutions and advantages of the embodiments of the present disclosure more clear, the technical solutions in the embodiments of the present disclosure will be clearly described with reference to the accompanying drawings. It is apparent that the described embodiments are a part but not whole of embodiments of the present disclosure. Based on the described embodiments in the present disclosure, all other embodiments obtained by ordinary technicians in the art without creative labor belong to the scope of protection of the present disclosure.

First Embodiment

A design solution of a capacitive pressure difference sensor is as follows.

(1) A working principle of the capacitive pressure difference sensor is differential capacitors, and the sensor has three layers of electrodes including an upper electrode, an intermediate electrode, and a lower electrode, which are located in an upper structure, an intermediate structure and a lower structure respectively. The upper electrode 39 is located in the upper structure, the intermediate electrode 11 is located in the intermediate structure, and the lower electrode 19 is located in the lower structure. The intermediate electrode 11 and the upper electrode 39 together form an upper capacitor, and the intermediate electrode 11 and the lower electrode 19 together form a low capacitor. A pressure difference between two sides of an intermediate-layer movable diaphragm 43 located in the intermediate electrode 11 causes the intermediate-layer movable diaphragm 43 to deform and shift, thereby causing the upper capacitor and the lower capacitor to change, and then a signal can be output. The change of the upper capacitor and the lower capacitor can be divided into three stages, including: when the pressure difference between the two sides is smaller, a spacing between the intermediate electrode and each of the upper and lower electrodes has only changed, but the intermediate electrode is not in contact with any one of the upper and lower electrodes; when the pressure difference between the two sides increases to a certain extent, the intermediate electrode is in contact with an electrode with a smaller pressure, and a spacing between the contacted two electrodes is a constant value, i.e., a thickness of a silicon dioxide insulation layer, since the thickness is very small, a capacitor between the contacted two electrodes is much larger than that of uncontacted two electrodes; and when the pressure difference between the two sides continues to increase, a contact area between the intermediate electrode and an electrode with a greater pressure increases, which can be explained as an opposite area of the electrodes increases. Based on this working principle, linearity, sensitivity and overload resistance of the pressure difference sensor will be improved.

(2) The sensor is made through bounding and then cutting three layers of wafers. A manner of the bonding is metal eutectic bonding. In a design solution of this embodiment, *Aurum*-Tin eutectic bonding is adopted. Similarly, copper-tin eutectic bonding may also be adopted. The reason why the metal eutectic bonding is used is that it has better air tightness and a smaller bonding area, a temperature required for the bonding is smaller, the requirement on a roughness of a bonding interface is lower, and a thermal stress of the device is smaller. Metal eutectic bonding layers can be represented using the reference numerals 5 and 13 in FIG. 2, where the reference numeral 5 refers to a metal eutectic bonding portion (upper metal bonding layer) between the upper structure and the lower structure, that is, a connection portion between an upper wafer and an intermediate wafer; and the reference numeral 13 refers to a metal eutectic bonding portion (lower metal bonding layer) between the intermediate structure and the lower structure, that is, a connection portion between the intermediate wafer and a lower wafer. In order to obtain the metal eutectic bonding portion 5 between the upper structure and the intermediate structure, it is necessary to sputter metal in advance for corresponding parts of the upper wafer and the intermediate wafer, that is to say, an upper portion of the metal eutectic bonding portion between the upper structure and the lower structure indicated by the reference numeral 5 in FIG. 2 comes from the upper wafer and a lower portion thereof comes from the intermediate wafer. Similarly, an upper portion of the metal eutectic bonding portion between the upper structure and the lower structure indicated by the reference numeral 13 comes from the intermediate wafer, and a lower portion thereof comes from the lower wafer.

Figure 2:
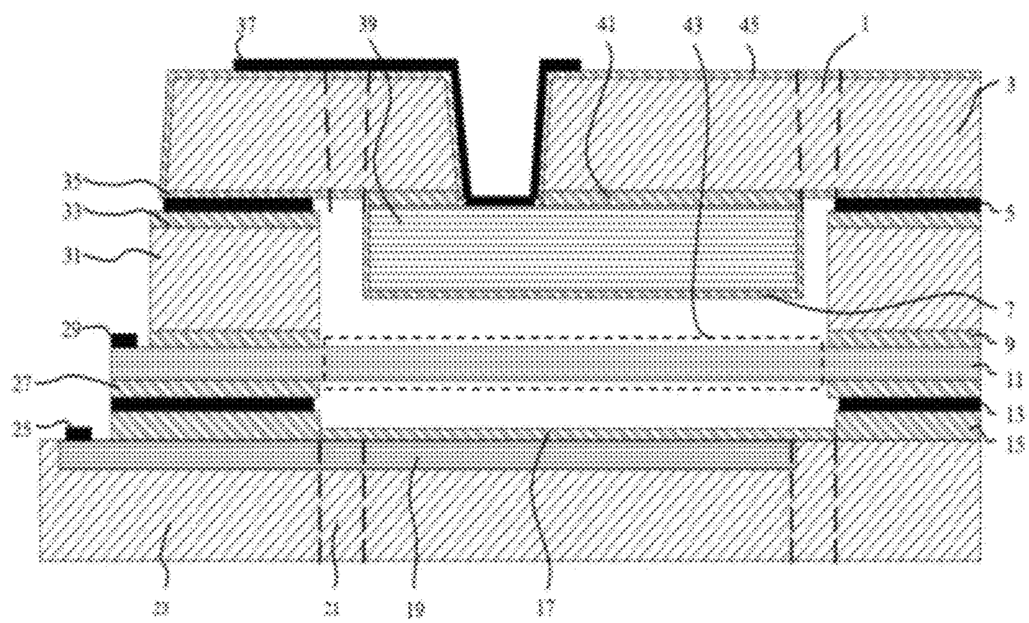
FIG. 2 illustrates a schematic structural view of a sensor of an MEMS capacitive pressure difference sensor according to an embodiment of the present disclosure.
Figure 3:
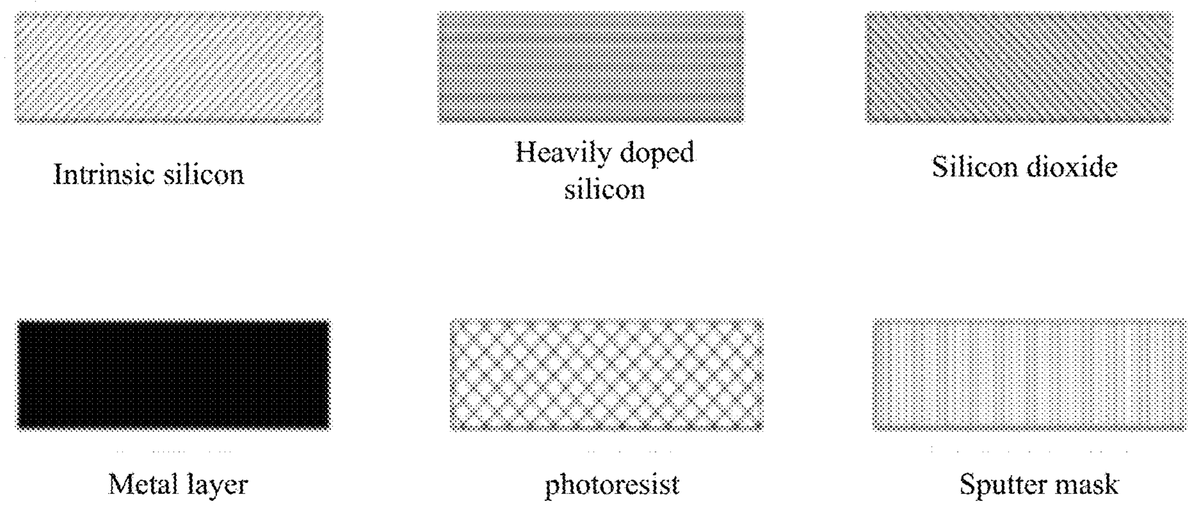
FIG. 3 illustrates a corresponding explanation of each legend according to an embodiment of the present disclosure.

(3) The upper electrode 39 is located in the upper structure (reference numerals 1, 3, 7, 35, 37, 39, 41, 43, and the upper portion of the upper metal bonding layer indicated by the reference numeral 5 shown in FIG. 2), and the upper structure is formed by processing the upper wafer. The intermediate electrode 11 is located in the intermediate structure (reference numerals 9, 11, 27, 29, 31, 33, the lower portion of the upper metal bonding layer indicated by the reference numeral 5 and the upper portion of the lower metal bonding layer indicated by the reference numeral 13 shown in FIG. 2), and the intermediate structure is formed by processing the intermediate wafer. The lower electrode 19 is located in the lower structure (reference numerals 15, 17, 19, 21, 23, 25 and the lower portion of the lower metal bonding layer indicated by the reference numeral 13 shown in FIG. 2).

(4) Reference numerals 7 and 17 in FIG. 2 respectively refer to a silicon dioxide insulation layer on a surface of the upper electrode and a silicon dioxide insulation layer on a surface of the lower electrode, which are used to prevent the capacitors from breakdown and failure when the electrodes are in contact, and play the role of insulation layers.

(5) Reference numerals 1 and 21 in FIG. 2 respectively refer to a pressure guide hole located in the upper structure and a pressure guide hole located in the lower structure. The two pressure guide holes surround the upper electrode (indicated by the reference numeral 39 in FIG. 2) and the lower electrode 19 respectively. A position distribution of the pressure guide hole located in the upper structure indicated by the reference numeral 1 in FIG. 2 is shown in blank parts of FIG. 5. A position distribution of the pressure guide hole located in the lower structure indicated by the reference numeral 21 in FIG. 2 is shown in blank parts of FIG. 11. The reason why the holes are made around the corresponding electrodes is that this arrangement can prevent the pressure guide holes from being blocked when a side with a smaller pressure contacts the intermediate-layer movable diaphragm.

(6) The upper structure of the sensor (reference numerals 1, 3, 7, 35, 37, 39, 41, 43, and the upper portion of the upper metal bonding layer indicated by the reference numeral 5 shown in FIG. 2) is obtained by processing an SOI wafer, in which an upper silicon part of the SOI wafer is intrinsic silicon with a high resistivity, an intermediate layer of the SOI wafer is silicon oxide, and a lower silicon part of the SOI wafer is heavily doped silicon. The upper electrode 39 is derived from the heavily doped silicon of the lower silicon part of the SOI wafer. The reference numeral 37 refers to a lead pad of the upper electrode, which is used to connect the upper electrode 39 to an external circuit.

(7) The intermediate structure of the sensor is obtained by processing an SOI wafer, in which an upper silicon part of the SOI wafer is intrinsic silicon with a high resistivity, an intermediate layer of the SOI wafer is silicon oxide, and a lower silicon part of the SOI wafer is heavily doped silicon. The intermediate electrode 11 is derived from the heavily doped silicon of the lower silicon part of the SOI wafer. The reference numeral 29 refers to a lead pad of the intermediate electrode, which is used to connect the intermediate electrode 11 to the external circuit.

Figure 10:
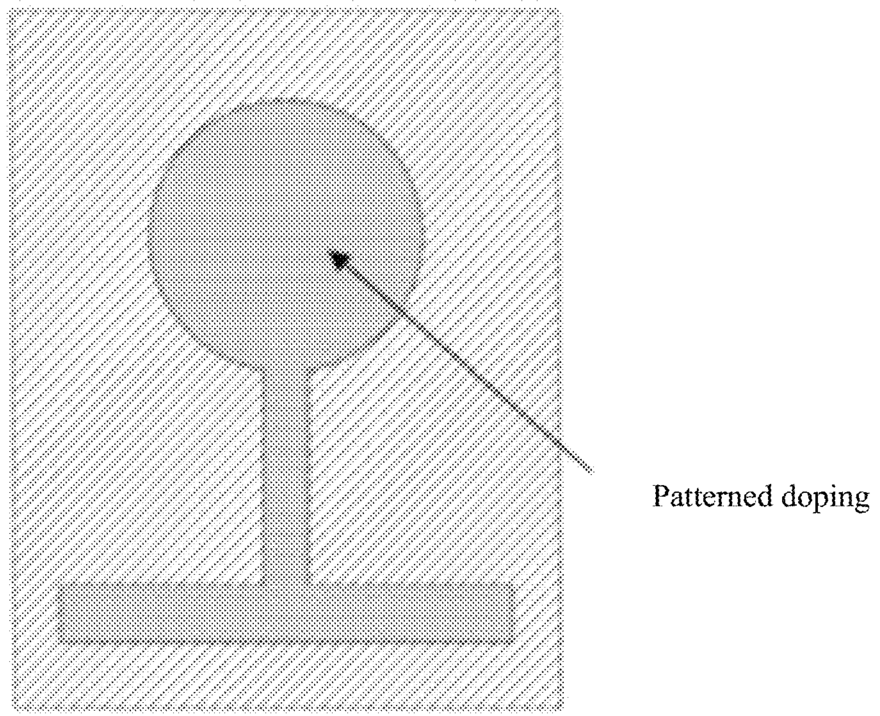
FIG. 10 illustrates a top view of the lower structure according to the embodiment of the present disclosure after being processed in step 1.
Figure 11:
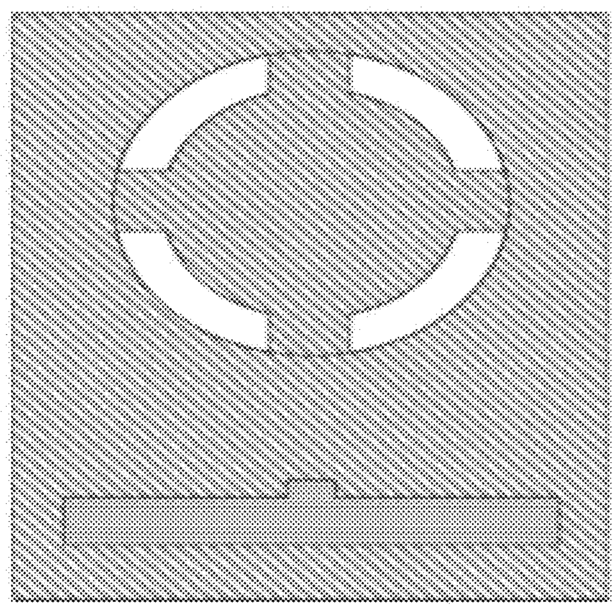
FIG. 11 illustrates a top view of the lower structure according to the embodiment of the present disclosure after being processed in step 5.
Figure 12:
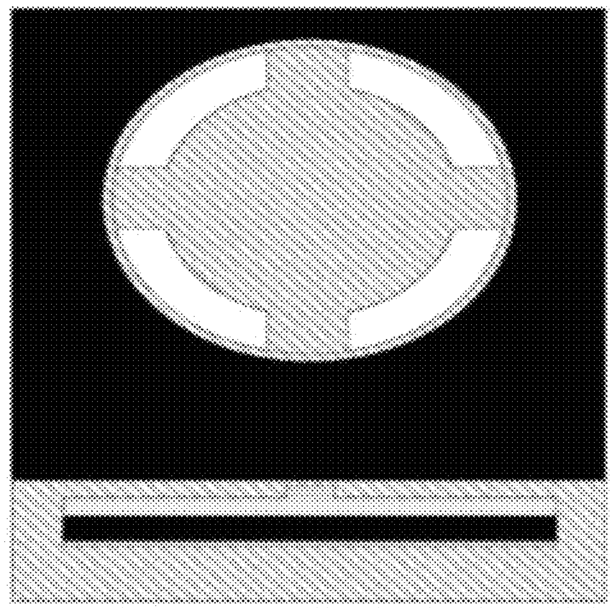
FIG. 12 illustrates a top view of the lower structure according to the embodiment of the present disclosure after being processed in step 9.

(8) The lower structure of the sensor is made of intrinsic silicon wafer with a high resistivity, the lower electrode is obtained through patterned doping on the SOI wafer, and a shape of a doped part is shown in the text description of FIG. 10. A circular portion of the doped part will serve as a capacitor plate, a bottom rectangle portion of the doped part is used to make ohmic contact with the lead pad 25 of the lower electrode, and a portion between the circular portion and the bottom rectangle portion is a lead portion, which is responsible for realizing electrical connection between the circular portion and the bottom rectangle portion. By thermal oxidation and patterning an oxide layer, the lead portion doped with silicon is covered under a silicon dioxide layer, and the portion having the ohmic contact is exposed, as shown in FIG. 11. The lead portion is covered with the silicon dioxide layer, therefore, the lower metal bonding layer 13 is prevented from being electrically connected with the lead portion when the metal eutectic bonding is adopted, thus realizing the electrical connection of the lead portion with an external metal solder joint through a side wall of the pressure cavity while ensuring the air tightness and a bonding strength of the pressure cavity.

(9) In order to ensure that the sensor can satisfy the three-stage change of the capacitors, a thickness of the intermediate-layer movable diaphragm (indicated by the reference numeral 43 in FIG. 2) can be selected from 0 to 10 μm, a ratio of the thickness to a diameter of the intermediate-layer movable diaphragm is greater than 1:10, a spacing between the upper electrode 39 and the intermediate electrode 11 is in a range from 1 to 10 μm, and a spacing between the intermediate electrode 11 and the lower electrode 19 is in a range from 1 to 10 μm.

(10) The spacing between the lower electrode and the intermediate electrode is mainly composed of three parts including: silicon dioxide 27 having supporting and insulating functions on the lower surface of the intermediate structure, the lower metal bonding layer 13, and silicon dioxide 15 having supporting and insulating functions on the upper surface of the lower structure. A thickness of the silicon dioxide having supporting and insulating functions on the lower surface of the intermediate structure is in a range from 0 to 3 μm, a thickness of the lower metal bonding layer in a range from 0 to 4 μm, a thickness of the silicon dioxide having supporting and insulating functions on the upper surface of the lower structure in a range from 0 to 3 μm, a sum of the three thicknesses is no more than 10 μm, which just satisfies the requirements of the three-stage change of the capacitors of the sensor for small electrode spacing.

(11) The three electrodes of the sensor make the electric field lines (a potential change path) of the constant portions of the upper capacitor and the lower capacitor relatively longer (as shown in FIG. 1), and use the intrinsic silicon with the high resistivity (indicated by the reference numerals 3, 23 and 31 in FIG. 2) and silicon dioxide with a high resistivity and a relatively small dielectric constant (indicated by the reference numerals 15, 27 and 31 in FIG. 2), which makes the constant capacitors relatively small and a resistivity of the sensor greatly improved.

(12) The lead pads of the sensor are shown by the reference numerals 25, 29, 37 in FIG. 2, the lead pad 37 is located in the upper structure, the lead pad 29 is located in the intermediate structure, the lead pad 25 is located in the lower structure, and the three lead pads are located in the three-layer structure respectively. Elevations of the three pads are different, and the three pads do not block each other, which can also be understood that the three lead pads are located on third steps, thus realizing that a leading operation can be performed from a direction perpendicular to the upper structure, which is convenient for the later packaging of the pressure difference sensor.

(13) The three layers of structures are formed together by the metal eutectic bonding. Compared with silicon-silicon direct bonding, the *Aurum*-Tin eutectic bonding or the copper-tin eutectic bonding process has much lower requirements on a bonding temperature, a pressure and a surface flatness. Further, compared with the anodic bonding process, the thermal stress problem caused by the mismatch of thermal expansion coefficients of materials is greatly reduced. Therefore, the metal eutectic bonding is more beneficial to realize the bonding of the complex three-layer structure and to manufacture the capacitive pressure difference sensor with three-layer structure.

Aiming at the design solution of the capacitive pressure difference sensor mentioned above, a corresponding process flow for manufacturing the capacitive pressure difference sensor is proposed. The specific processes used in the corresponding process flow are all existing mature processes, but for an MEMS device, it is often “one device, one process”, and the focus of innovation lies in the design of a process sequence. In terms of process flow, the pressure difference sensor designed in the present disclosure needs to process the wafers in which the upper, intermediate and lower structures are located respectively, then make the three-layer wafer become a whole through the metal eutectic bonding, and finally cut the three layers of wafers into separate sensors. Each specific process flow of the three-layer wafer will be described below.

Figure 4:
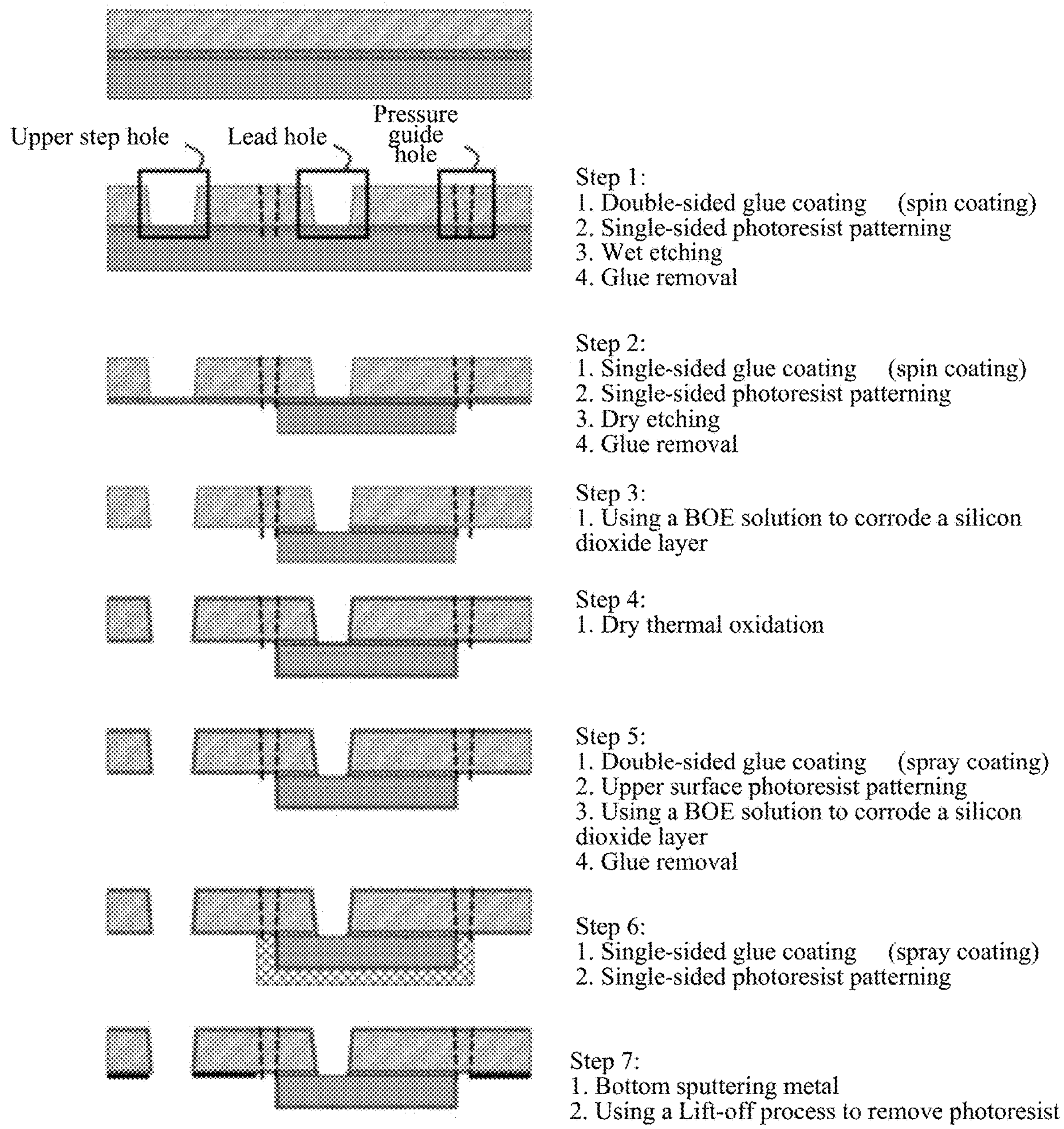
FIG. 4 illustrates a schematic view of a manufacturing process of an upper structure of a pressure difference sensor according to an embodiment of the present disclosure.

1. A Process Flow of the Upper Structure (as Shown in FIG. 4)

Material Description: the upper structure is made of an SOI wafer, in which an upper silicon part of the SOI wafer is intrinsic silicon with a high resistivity, an intermediate layer of the SOI wafer is silicon oxide, and a lower silicon part of the SOI wafer is heavily doped silicon.

In step 1, a pressure guide hole (indicated by the reference numerical 1 in FIG. 2), a lead hole, an upper step hole, alignment marks and cutting marks located in the upper structure are etched. Specifically, the step 1 includes: cleaning the SOI wafer with alcohol, acetone and deionized water; Using a Hexamethyldisilazane (HMDS) oven to deposit tackifier on a surface of the SOI wafer to enhance adhesion of photoresist; coating the photoresist (positive adhesive) on an upper surface of the SOI wafer by spin coating; using the oven to pre-bake the photoresist on the upper surface for the first time; coating the photoresist (positive adhesive) on a lower surface of the SOI wafer by spin coating; using the oven to pre-bake the photoresist for the second time; exposing the photoresist on the upper surface, where an exposed portion includes the pressure guide hole, the lead hole, the upper step hole, the alignment marks and the cutting marks; using developer to expose etched parts; using the oven to post-bake the photoresist; using Tetramethyl ammonium hydroxide (TMAH) solution to wet etch the exposed portion until the silicon dioxide layer is reached; using the alcohol, the acetone, the deionized water and a Piranha solution to remove the photoresist.

In step 2, an etching process is performed on a lower surface of the SOI wafer to form a boss, so as to prepare for making the upper electrode (indicated by the reference numeral 39 in FIG. 2). Specifically, the step 2 includes: using the alcohol, the acetone and the deionized water to clean the SOI wafer; using the HDMS oven to deposit the tackifier on the surface of the SOI wafer to enhance adhesion of the photoresist; coating the photoresist (positive adhesive) on the lower surface of the SOI wafer by spin coating; using the oven to pre-bake the photoresist; exposing the photoresist on the lower surface to align with the alignment marks on the upper surface, where an exposed portion includes a region outside the boss and the alignment marks; using the oven to post-bake the photoresist; using an inductively coupled plasma (ICP) etching machine to dry etch the exposed portion until the silicon dioxide layer is reached; using the alcohol, the acetone, the deionized water and the Piranha solution to remove the photoresist.

In step 3, the exposed silicon dioxide layer after etching the lower surface is removed. Specifically, the step 3 includes: etching the exposed silicon dioxide layer using a buffered oxide etch (BOE) solution, and then cleaning the SOI wafer.

Figure 5:
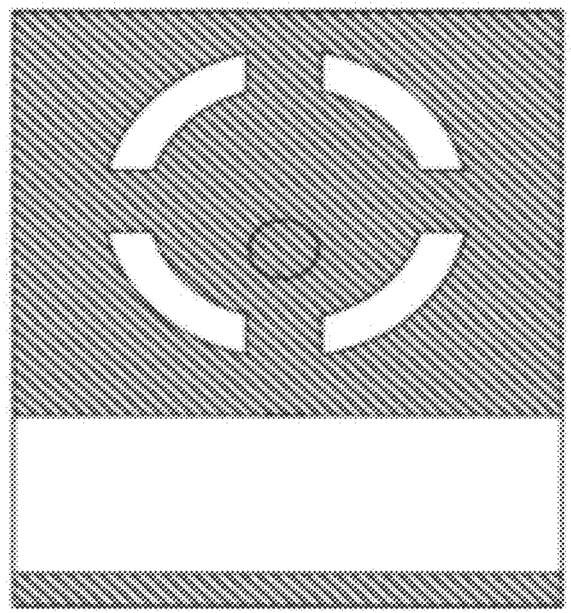
FIG. 5 illustrates a top view of the upper structure according to the embodiment of the present disclosure after being processed in step 4.

In step 4, an insulating silicon dioxide layer is formed on the surface of the SOI wafer, that is, silicon dioxide having an insulating function on the upper surface of the upper structure (indicated by the reference numeral 45 in FIG. 2) and silicon dioxide having supporting and insulating functions on the lower surface of the upper structure (indicated by the reference numeral 35 in FIG. 2). Specifically, the step 4 includes: performing dry thermal oxidation on the SOI wafer to generate an electrical insulation layer on a surface of the upper electrode. After processing, a top view of the upper surface of the upper structure is shown in FIG. 5.

In step 5: the upper electrode (reference numeral 39 in FIG. 2) is exposed from the upper surface to prepare for a consequent lead. Specifically, the step 5 includes: using the alcohol, the acetone and the deionized water to clean the SOI wafer; using the HDMS oven to deposit tackifier on a surface of the SOI wafer to enhance adhesion of the photoresist; coating the photoresist (positive adhesive) on the lower surface of the SOI wafer using a glue sprayer; Using the oven to pre-bake the photoresist on the lower surface for the first time; coating the photoresist (positive adhesive) on the upper surface of the SOI wafer using the glue sprayer; using the oven to pre-bake the photoresist for the second time; exposing the photoresist on the upper surface, where an exposed portion includes a circular hole of a lead portion; using developer to expose the exposed portion; using the oven to post-bake the photoresist; using the BOE solution to wet etch the exposed portion until the silicon dioxide layer is reached; and using the alcohol, the acetone, the deionized water and the Piranha solution to remove the photoresist. The glue sprayer is chosen because the surface of the SOI wafer already has a through hole and a high-step structure, so spraying is chosen for the uniformity of glue application. After the processing is completed, the top view of the upper surface of the upper structure is shown in FIG. 5.

In step 6, a process for preparing for manufacturing a portion of the upper metal bonding layer (indicated by the reference numeral 5 in FIG. 2) located in the upper structure is performed. The upper wafer is coated with the photoresist by a glue spraying process, and then exposed, developed and post-baked in sequence after drying, so that a non-bonded region is covered with the photoresist.

Figure 6:
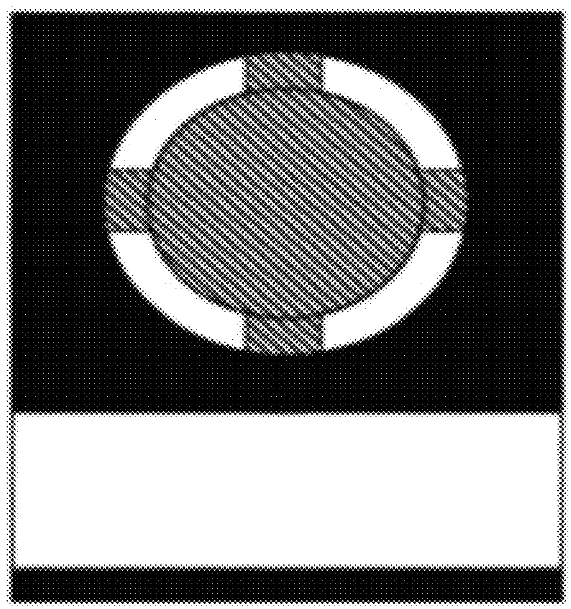
FIG. 6 illustrates a bottom view of the upper structure according to the embodiment of the present disclosure after being processed in step 7.

In step 7, a process for manufacturing the portion of the upper metal bonding layer (indicated by the reference numeral 5 in FIG. 2) located in the upper structure. Specifically, the step 7 includes: performing metal sputtering on the lower surface of the SOI wafer, and Titanium (Ti), Nickel (Ni) and aurum (Au) are sputtered on the lower surface in turn. The sputtering of the lower surface is for forming the upper metal bonding layer (indicated by the reference numeral 5 in FIG. 2) together with a metal layer of the intermediate structure. The upper structure can be obtained by using a Lift-off process to complete metal patterning and then annealing. After processing, the top view of the upper surface of the upper structure is shown in FIG. 5, and a top view of the lower surface is shown in FIG. 6.

2. A Process Flow of the Intermediate Structure (as Shown in FIG. 7)

In step 1, silicon dioxide is formed on a surface of the intermediate structure to prepare for the formation of silicon dioxide 27 having supporting and insulating functions on the lower surface of the intermediate structure and silicon dioxide 33 having supporting and insulating functions on the upper surface of an intermediate structure; and to prepare for the formation of a portion of the upper metal bonding layer 5 located in the intermediate structure, a portion of the lower metal bonding layer 13 located in the intermediate structure, and the lead pad 25 of the lower electrode. Firstly, wet thermal oxidation is performed on a surface of an SOI wafer to form a thick oxide layer. Then, upper and lower surfaces of the SOI wafer are coated with photoresist, exposed and developed. After that, metal sputtering is performed, including sputtering metal such as Ti, Ni, Au, Tin (Sn) and Au in turn, and the photoresist is stripped by a Lift-off process to complete metal patterning.

In step 2, silicon dioxide on a surface of a portion to be etched is removed. The SOI wafer (silicon wafer) is coated with the photoresist, exposed, and then developed on both sides thereof to expose the silicon dioxide corresponding to a cutting hole and the intermediate-layer movable diaphragm. A BOE solution is used to etch the exposed silicon dioxide. After that, an acetone solution is used to dissolve the photoresist.

In step 3, the cutting hole and the intermediate-layer movable diaphragm are formed. The SOI wafer is coated with photoresist, exposed and developed on both sides thereof, and then the upper and lower surfaces of the SOI wafer are etched successively until a silicon dioxide layer in the middle of the SOI wafer is reached.

In step 4, the photoresist is removed. After the etching is completed, because the intermediate-layer movable diaphragm has been formed and the intermediate-layer movable diaphragm is thin, when acetone is used to remove the photoresist, if the SOI wafer is directly taken out of the acetone, a surface tension of the acetone will break the intermediate-layer movable diaphragm, so it is not possible to take the wafer directly from the acetone. As such, the acetone can be diluted continuously by adding alcohol and then deionized water, and the acetone can be heated at the same time to accelerate volatilization. Finally, after the acetone is volatilized, the SOI wafer can be taken out.

3. A Process Flow of the Lower Structure (as Shown in FIG. 9)

In step 1, the lower electrode (indicated by the reference numeral 19 in FIG. 2) is formed. Firstly, upper and lower surfaces of an intrinsic silicon wafer are coated with photoresist, exposed, developed, etched and degummed to form alignment marks of the intrinsic silicon wafer. Patterned ion implantation is performed on an upper surface of the intrinsic silicon wafer, and a process design with a high dose and a high voltage is selected during the patterned ion implantation. Shapes of the lower electrode and a lead portion thereof are shown in FIG. 10.

In step 2, silicon dioxide on a surface of the lower structure is formed to prepare for the subsequent processing, and a roughness of the surface is reduced and a flatness of the surface is improved at the same time. Wet thermal oxidation is performed on an upper surface of a matrix (the intrinsic silicon wafer). The reason why the wet thermal oxidation is selected is that an oxide layer generated by the wet thermal oxidation is thicker and the quality of the oxide layer is good in all aspects. Then, a planarization operation is performed. The reason why the planarization operation is selected is that a growth rate of an oxide layer in a doped part is higher than that in an intrinsic silicon part during the oxidation process, therefore, considering the later bonding operation, the planarization operation is used to improve the flatness.

In step 3, pressure guide holes (indicated by the reference numeral 21 in FIG. 2) in the lower structure are formed and the lower electrode is exposed. Both surfaces of the matrix (the intrinsic silicon wafer) are coated with photoresist by spin coating, and metal patterning of the photoresist is completed. A region corresponding to the lower electrode is exposed from an upper surface of the matrix, and a region corresponding to the pressure guide holes is exposed from a lower surface of the matrix. Firstly, A BOE solution is used to etch silicon dioxide exposed from the upper surface and the lower surface, and then the lower surface is dry etched to complete the manufacture of the pressure guide holes (indicated by the reference numeral 21 in FIG. 2) of the lower structure. The residual photoresist is removed.

In step 4, a silicon dioxide insulation layer (indicated by the reference numeral 17 in FIG. 2) on an exposed surface of the lower electrode is formed. Dry thermal oxidation is performed.

In step 5, doped silicon under the lead pad (indicated by the reference numeral 25 in FIG. 2) of the lower electrode is exposed. An upper surface of the lower wafer is coated with glue. A glue spraying manner is selected because of the existence of through holes. After exposure and development, a BOE solution is used to etch the exposed silicon dioxide to prepare for the manufacture of the lead pad (indicated by the reference numeral 25 in FIG. 2) of the lower electrode.

In step 6, metal sputtering is performed to prepare for the formation of a portion of the lower metal bonding layer (indicated by the reference numeral 13 in FIG. 2) located in the lower structure and the lead pad (indicated by the reference numeral 25 in FIG. 2) of the lower electrode. The upper surface of the matrix is coated with the photoresist again. Because the matrix has a through-hole structure, the gluing manner is spraying. After the patterning of the photoresist is completed, Ti, Ni and Au are sputtered to complete the manufacture of metal needed by the lower metal bonding layer in the lower structure and metal needed by the lead pad.

In step 7, the portion of the lower metal bonding layer (indicated by the reference numeral 13 in FIG. 2) located in the lower structure and the lead pad (indicated by the reference numeral 25 in FIG. 2) of the lower electrode are formed. The Lift-off process is performed to complete metal patterning.

Figure 13:
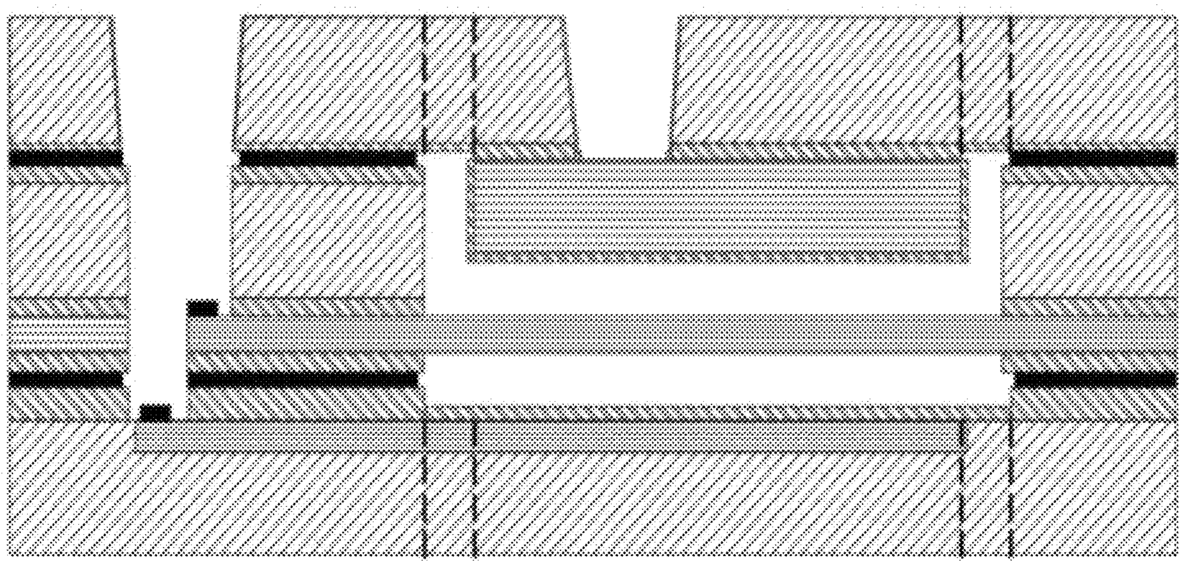
FIG. 13 illustrates a schematic view of a three-layer structure after three-layer wafer bonding is completed according to the embodiment of the present disclosure.

Under an environmental condition of a certain temperature and a pressure, metal eutectic bonding is performed on the three-layer wafer, and the obtained structure is shown in FIG. 13.

Figure 14:
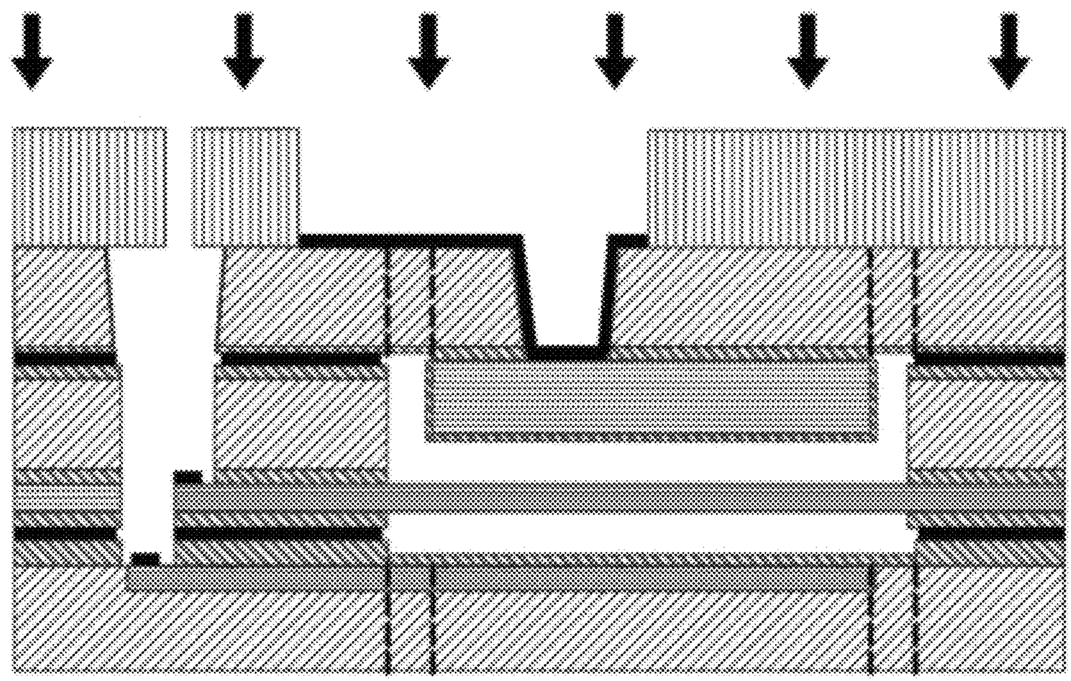
FIG. 14 illustrates a schematic view of magnetron sputtering of an upper electrode lead pad and a lower electrode lead pad after three-layer wafer bonding is completed according to the embodiment of the present disclosure.

After the eutectic bonding is completed, the lead pad (indicated by the reference numeral 37 in FIG. 2) of the upper electrode and the lead pad (indicated by the reference numeral 29 in FIG. 2) of the intermediate electrode are manufactured. The three bonded-layer wafer is covered with a sputter mask and is aligned. After that, Ti, Ni and Au are sputtered in turn to complete the manufacture of the lead pads. The manufacturing schematic view is shown in FIG. 14.

Figure 15:
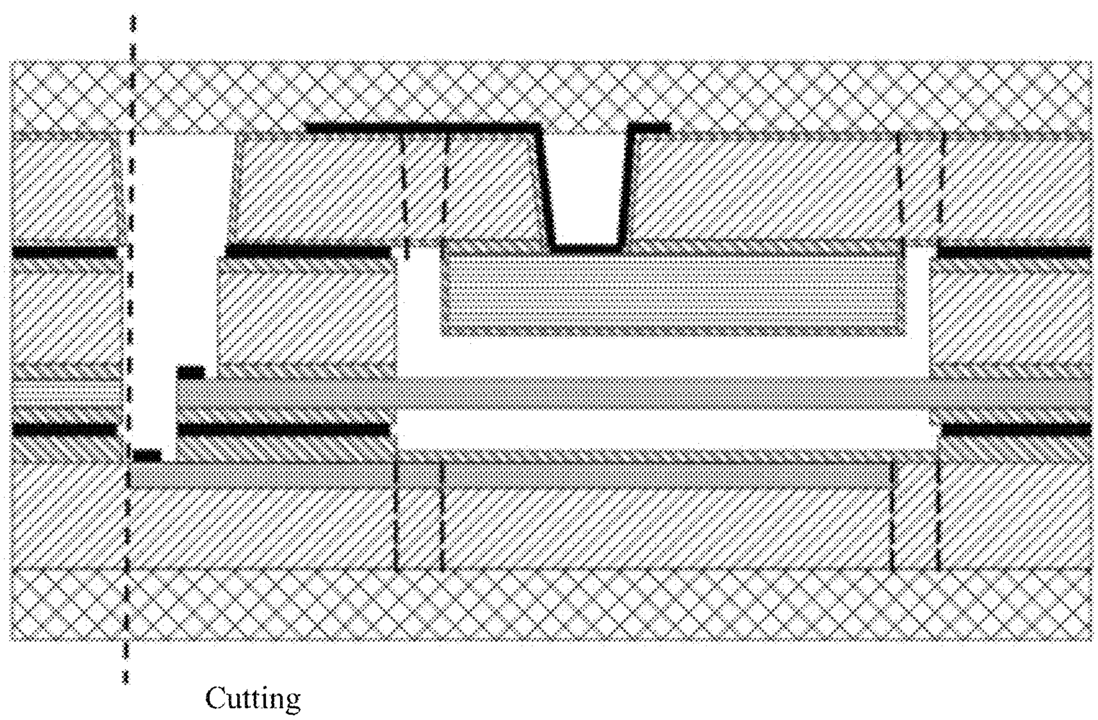
FIG. 15 illustrates a schematic view of a cutting method after three-layer wafer bonding is completed according to the embodiment of the present disclosure.

Cutting is then performed. Because dust will be generated during the cutting and enter the cavity through the pressure guide hole, a peeling photosensitive dry film is used to cover the upper and lower surfaces of three bonded-layer wafer first. After cutting, exposure is performed, and then r the peeling photosensitive dry film is removed to complete the manufacture of the overall structure. The schematic view of the cutting process is shown in FIG. 15.

Figure 16:
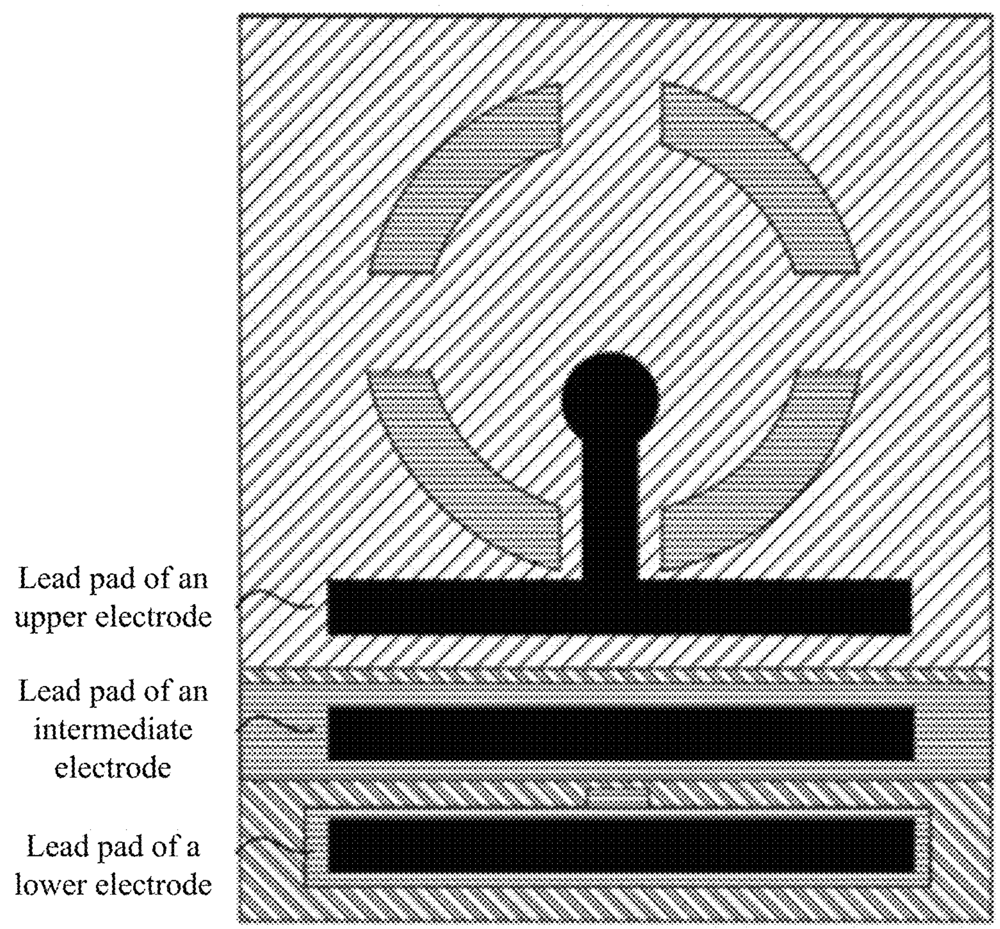
FIG. 16 illustrates a top view of an independent pressure difference sensor after cutting is completed according to the embodiment of the present disclosure.

After the cutting is completed, an independent pressure difference sensor structure can be obtained, a top view of which is shown in FIG. 16.

Second Embodiment

A design method of an MEMS contact capacitive pressure difference sensor includes the following steps.

(1) For a patterned constant electrode and its lead circuit prepared by doping process, ion implantation is used to complete deep doping of a high dose and a high voltage for the electrode. After that, wet oxidation and planarization of a silicon wafer are completed, and a silicon oxide layer is partially corroded to expose a patterned part of the electrode. The reason for the planarization operation is that an oxidation rate of a doped part is too high, resulting in a surface of the silicon oxide layer of the doped part being slightly higher than that of an undoped part, and a flatness of the whole wafer exceeds the requirement for the bonding.

(2) Upper, intermediate and lower layers of bonded silicon wafers are etched and cut to form grooves respectively, and sensor areas of the three bonded silicon wafers have a same width, and a length increases from top to bottom of the three bonded silicon wafers by tens to hundreds of microns. After covering the pressure guide hole with a mask (e.g. white film), the sensor is cut into a rectangle and form a three-layer lead step (as shown in FIG. 13).

In terms of a process flow, the pressure difference sensor designed in the present disclosure needs to first process the upper, intermediate and lower three-layer structures respectively, then perform metal eutectic bonding on the three-layer structures, and finally a cutting process is performed to obtain separated sensors.

The basic principle, main features and advantages of the present disclosure have been shown and described above. It should be understood by those skilled in the art that the present disclosure is not limited by the above-mentioned embodiments, but the above-mentioned embodiments and descriptions are merely used to describe the principles of the present disclosure, and various changes and improvements in the present disclosure without departing from the spirit and scope of the present disclosure can be obtained, which fall within the scope of protection of the present disclosure. The scope of protection claimed by the present disclosure is defined by the appended claims and their equivalents.

What is claimed is:

1. A pressure difference sensor, manufactured by a manner of bonding three layers of wafers, and comprising: an upper structure, an intermediate structure and a lower structure;

wherein each of the upper structure and the intermediate structure is manufactured by a silicon-on-insulator (SOI) wafer, and the lower structure is manufactured by patterned doped intrinsic silicon;

wherein an upper electrode, an intermediate electrode and a lower electrode are respectively arranged on the upper structure, the middle structure and the lower structure, and a lead pad of each of the upper electrode, the intermediate electrode and the lower electrode is located on a corresponding one of three-stepped steps at a side of the pressure difference sensor;

wherein annular through holes are formed around the upper electrode and the lower electrode; the pressure difference sensor is made by cutting the three layers of wafers after bonding of the three layers of wafers, and a manner of the bonding is metal eutectic bonding;

wherein the metal eutectic bonding comprises an upper metal bonding layer and a lower metal bonding layer, an upper portion of the upper metal bonding layer comes from an upper wafer and a lower portion of the upper metal bonding layer comes from an intermediate wafer; and an upper portion of the lower metal bonding layer comes from an intermediate wafer and a lower portion of the lower metal bonding layer comes from a lower wafer;

wherein the upper electrode is located in the upper structure, and is formed by processing the upper wafer; the intermediate electrode is located in the intermediate layer structure, and is formed by processing the intermediate wafer; the lower electrode is located in the lower structure;

wherein a pressure guide hole in the upper structure and a pressure guide hole in the lower structure are arranged to be surround the upper electrode and the lower electrode respectively;

wherein the upper structure is made by processing the SOI wafer, an upper silicon part of the SOI wafer is intrinsic silicon with a high resistivity, an intermediate layer of the SOI wafer is silicon oxide, a lower silicon part of the SOI wafer is heavily doped silicon, and the upper electrode is derived from the heavily doped silicon of the lower silicon part of the SOI wafer;

wherein the intermediate structure is made by processing the SOI wafer, an upper silicon part of the SOI wafer is intrinsic silicon with a high resistivity, an intermediate layer of the SOI wafer is silicon oxide, a lower silicon part of the SOI wafer is heavily doped silicon, and the intermediate electrode is derived from the heavily doped silicon of the lower silicon part of the SOI wafer; and the lead pad of the intermediate electrode is configured to connect the intermediate electrode to an external circuit;

wherein the lower structure is made by processing an intrinsic silicon wafer with a high resistivity, the lower electrode is made through patterned doping of the wafer, a circular portion of a doped part plays the role of a capacitor plate, a bottom rectangle portion of the doped part is configured to make ohmic contact with the lead pad of the lower electrode, and a portion between the circular portion and the bottom rectangle portion is a lead portion, which is responsible for realizing the electrical connection between the circular portion and the bottom rectangle portion;

wherein a spacing between the lower electrode and the intermediate electrode is composed of three parts comprising: silicon dioxide having supporting and insulating functions on a lower surface of the intermediate structure, the lower metal bonding layer, and silicon dioxide having supporting and insulating functions on an upper surface of the lower structure; and wherein a thickness of the silicon dioxide having supporting and insulating functions on the lower surface of the intermediate structure is in a range from 0 to 3 μm, a thickness of the lower metal bonding layer is in a range from 0 to 4 μm, a thickness of the silicon dioxide having supporting and insulating functions on the upper surface of the lower structure is in a range from 0 to 3 μm, and a sum of the three thicknesses is no more than 10 μm.

2. A manufacturing method of a sensor comprising the pressure difference sensor according to claim 1, wherein the method comprises process flows for manufacturing the upper structure, the intermediate structure and the lower structure;

wherein the process flow for manufacturing the upper structure comprises:

step 1, etching the pressure guide hole, a lead hole, an upper step hole, aligning marks and cutting marks located in the upper structure;

step 2, performing etching a lower surface to form a boss to prepare for manufacturing the upper electrode;

step 3, removing a silicon dioxide layer exposed after etching the lower surface;

step 4, forming an insulating silicon dioxide layer on a surface of the wafer, that is, the silicon dioxide having supporting and insulating functions on the lower surface of the intermediate structure, and the silicon dioxide having supporting and insulating functions on the upper surface of the lower structure;

step 5, exposing the upper electrode on the upper surface to prepare for a consequent lead;

step 6, preparing for manufacturing a portion of the upper metal bonding layer located in the upper structure; and step 7, manufacturing the portion of the upper metal bonding layer located in the upper structure;

wherein the process flow for manufacturing the intermediate structure comprises:

step 1, forming silicon dioxide on a surface to: prepare for forming silicon dioxide having supporting and insulating functions on the lower surface of the intermediate structure and silicon dioxide having supporting and insulating functions on the upper surface of an intermediate structure; and prepare for forming a portion of the upper metal bonding layer located in the intermediate structure, a portion of the lower metal bonding layer located in the intermediate structure, and the lead pad of the lower electrode;

step 2, removing silicon dioxide on a surface of a portion to be etched;

step 3, forming a cutting hole and the intermediate-layer movable diaphragm; and step 4, removing the photoresist;

wherein the process flow for manufacturing the lower structure comprises:

step 1: forming the lower electrode;

step 2: forming silicon dioxide on a surface of the lower structure to prepare for the subsequent processing, and reducing a roughness of the surface and improving a flatness of the surface;

step 3: forming the pressure guide hole in the lower structure to expose the lower electrode;

step 4, forming a silicon dioxide insulating layer on an exposed surface of the lower electrode;

step 5, exposing doped silicon under the lead pad of the lower electrode;

step 6, sputtering metal to prepare for forming a portion of the lower metal bonding layer located in the lower structure and the lead pad of the lower electrode; and step 7: forming a portion of the lower metal bonding layer located in the lower surface and the lead pad 25 of the lower electrode.

3. A design method of a Micro-Electro-Mechanical Systems (MEMS) contact capacitive pressure difference sensor comprising the pressure difference sensor according to claim 1, and the method comprising:

(1) for a patterned constant electrode and a lead circuit thereof manufactured by a doping process, using ion implantation used to complete deep doping of a high dose and a high voltage for the electrode; after that, completing wet oxidation and planarization of a silicon wafer, and partially corroding a silicon oxide layer to expose a patterned part of the electrode; wherein the reason for the planarization operation is that an oxidation rate of a doped part is higher, resulting in a surface of the silicon oxide layer of the doped part being slightly higher than that of an undoped part, and a flatness of the whole wafer exceeds the requirement for the bonding; and (2) etching and cutting upper, intermediate and lower layers of bonded silicon wafers to form grooves respectively, wherein sensor areas of the three bonded silicon wafers have a same width, and a length increases from top to bottom of the three bonded silicon wafers by tens to hundreds of microns; and after covering the pressure guide hole with a mask, cutting the sensor into a rectangle and form a three-layer lead step.

4. The pressure difference sensor according to claim 1 further comprising a signal acquisition circuit.

* * * * *